United States Patent
Kruglick

(10) Patent No.: US 9,364,763 B2
(45) Date of Patent: *Jun. 14, 2016

(54) USER ASSEMBLY OF LIGHTWEIGHT USER INTERFACE FOR GAMES

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/739,443

(22) Filed: Jun. 15, 2015

(65) Prior Publication Data

US 2015/0273344 A1 Oct. 1, 2015

Related U.S. Application Data

(63) Continuation of application No. 13/878,126, filed as application No. PCT/US2012/069307 on Dec. 12, 2012, now Pat. No. 9,101,840.

(51) Int. Cl.
| | |
|---|---|
| *G06F 17/00* | (2006.01) |
| *A63F 13/825* | (2014.01) |
| *A63F 13/355* | (2014.01) |
| *A63F 13/822* | (2014.01) |
| *A63F 13/323* | (2014.01) |
| *A63F 13/23* | (2014.01) |
| *A63F 13/795* | (2014.01) |

(Continued)

(52) U.S. Cl.
CPC ............ *A63F 13/825* (2014.09); *A63F 13/23* (2014.09); *A63F 13/323* (2014.09); *A63F 13/355* (2014.09); *A63F 13/795* (2014.09); *A63F 13/822* (2014.09); *A63F 13/87* (2014.09); *G06F 3/048* (2013.01)

(58) Field of Classification Search
USPC ........................................ 463/29–33
See application file for complete search history.

(56) References Cited

U.S. PATENT DOCUMENTS

| | | | |
|---|---|---|---|
| 5,202,828 | A | 4/1993 | Vertelney et al. |
| 5,692,142 | A | 11/1997 | Craycroft et al. |
| 5,905,251 | A | 5/1999 | Knowles |

(Continued)

OTHER PUBLICATIONS

Ennals, R.J., and Garofalakis, M.N., "MashMaker: Mashups for the Masses," Proceedings of the 2007 ACM SIGMOD international conference on Management of data, 3 pages (Jun. 11-14, 2007).

(Continued)

*Primary Examiner* — Ronald Laneau
(74) *Attorney, Agent, or Firm* — Brundidge & Stanger, P.C.

(57) ABSTRACT

Technology is described for user assembly of lightweight user interfaces for games, e.g., massively multiplayer online games. The technology can include a set of pre-selectable action modules; an interface element, a messaging element, and a display element for each pre-selectable action module; and a component configured to enable a user to select a subset from the set of pre-selectable action modules. A first subset of the pre-selectable action modules can provide a different user interface than a second subset of the pre-selectable action modules when at least one pre-selectable action module is in the first subset but not the second subset. Action modules may be capable of communicating using a messaging platform with at least one server computing device and relates to a massively multiplayer online gaming system operating at a server computing device.

20 Claims, 6 Drawing Sheets

(51) Int. Cl.
*A63F 13/87* (2014.01)
*G06F 3/048* (2013.01)

(56) References Cited

U.S. PATENT DOCUMENTS

| | | | |
|---|---|---|---|
| 6,005,563 A | 12/1999 | White et al. | |
| 7,127,685 B2 | 10/2006 | Canfield et al. | |
| 7,647,560 B2 | 1/2010 | Macauley et al. | |
| 7,665,035 B2 | 2/2010 | Burnett | |
| 8,226,476 B2 * | 7/2012 | Haltovsky | A63F 13/12 463/30 |
| 8,448,095 B1 | 5/2013 | Haussila et al. | |
| 8,782,546 B2 | 7/2014 | Haussila et al. | |
| 2002/0018078 A1 | 2/2002 | Khan et al. | |
| 2004/0113941 A1 | 6/2004 | Sliwa et al. | |
| 2004/0242322 A1 | 12/2004 | Montagna et al. | |
| 2005/0182693 A1 | 8/2005 | Alivandi | |
| 2006/0135261 A1 | 6/2006 | Kinne et al. | |
| 2006/0143684 A1 | 6/2006 | Morris | |
| 2007/0077985 A1 * | 4/2007 | Walker | G07F 17/32 463/20 |
| 2010/0105441 A1 | 4/2010 | Voss et al. | |
| 2010/0178973 A1 * | 7/2010 | Snoddy | A63F 13/12 463/19 |
| 2010/0267448 A1 * | 10/2010 | Snoddy | A63F 13/12 463/30 |
| 2011/0086706 A1 | 4/2011 | Zalewski | |
| 2012/0054634 A1 | 3/2012 | Stone et al. | |
| 2012/0130856 A1 | 5/2012 | Petri et al. | |
| 2012/0214562 A1 | 8/2012 | Im | |

OTHER PUBLICATIONS

Fujima, J., et al., "Clip, Connect, Clone: Combining Application Elements to Build Custom Interfaces for Information Access." Proceedings of the 17th annual ACM symposium on User interface software and technology, 10 pages (Oct. 24-27, 2004).

International Search Report with written opinion for International Application No. PCT/US2012/069307 mailed Feb. 20, 2013.

Lédeczi, Á., et al., "Composing Domain-Specific Design Environments," IEEE Computer, vol. 34, Issue 11, pp. 44-51 (Nov. 2001).

Magnuson, B., "Building Blocks for Mobile Games: A Multiplayer Framework for App Inventor and Android", Massachusetts Institute of Technology, 210 pages (Feb. 2, 2010).

McIlraith, S., and Son, T.C., "Adapting Golog for Programming the Semantic Web," Working Notes of the Fifth International Symposium on Logical Formalizations of Commonsense Reasoning, pp. 195-202 (Mar. 2001).

Page, S.R., et al., "User customization of a word processor," CHI'96 Proceedings of the SIGCHI Conference on Human Factors in Computing Systems, 10 pages (Apr. 13, 1996).

Reahard, J., "Trion announces Red Door publishing and development platform," accessed at: http://massively.joystiq.com/2011/10106/trion-announces-red-door-publishing-and-development-platform/, 4 pages (Oct. 6, 2011).

World of Warcraft® Remote, accessed at: http://us.battle.net/wow/en/services/wow-remote/, 3 pages (Aug. 9, 2012).

* cited by examiner ial developer may design action modules to enable a user to select the action modules the user anticipates using during the user's interaction with the game. A game designer or other person may design the action modules. The user may select a first set of action modules when using a first type of device, e.g., a mobile phone, and may select a second set of action modules when using a second type of device, e.g., a tablet computing device. As an example, the user may desire to communicate with other players (or non-player characters) using a first device and so may select action modules to enable text or voice communications. The user may desire, however, to trade goods using a second device and so may select action modules to facilitate trading. The user may use some of the action modules on both devices, e.g., to monitor what other players or non-player characters are doing.

USER ASSEMBLY OF LIGHTWEIGHT USER INTERFACE FOR GAMES

CROSS-REFERENCE TO RELATED APPLICATIONS

This application is a Continuation application under 35 U.S.C. §120 of U.S. Ser. No. 13/878,126, filed on Apr. 5, 2013, now U.S. Pat. No. 9,101,840, which is a National Stage filing under 35 U.S.C §371 of PCT Application Ser. No. PCT/US12/69307 filed on Dec. 12, 2012. The disclosures of both Applications are hereby incorporated herein by reference in their entireties.

BACKGROUND

Many massively multiplayer online games (MMOs), e.g., online immersive virtual world games, attempt to provide some sort of lightweight experience to keep players engaged and involved when they are away from a desktop computer, game console, or other system capable of playing the full game. Lightweight experiences are those involving browsers, smaller programs than full game clients, or mobile computing devices, e.g., tablet computing devices, smartphones, etc. Conventional MMOs, however, have extremely limited interaction for situations with reduced interface levels like mobile or other small devices: they either have a "full interface" corresponding to their desktop or game console counterparts, or very little access at all. For example, some MMOs offer a subscription plan to enable users (also referred to herein as players) to participate in a minimal way, e.g., to "craft" or build game-related paraphernalia using mobile computing devices. However, vendors of MMOs are incentivized to provide as much of an immersive experience to game players as possible—no matter what device they are using—because game players are typically willing to spend a lot of money to enhance their gameplay.

Providing an immersive experience on mobile computing devices is challenging because of several problems. One problem is that there is limited screen space on mobile computing devices. A full game experience available on a large screen is very difficult to mimic on smaller screens. Another problem is that processors used in mobile devices presently are not as powerful as the processors used in desktop computers and game consoles. Still another problem relates to game server design. For various types of games, e.g., "database" centric games where each character is one of many people placing demands on a database, each player who is allowed to interact through the web or other lightweight environment provides roughly the same server load as a desktop full-graphics player because the use by both players is translated to a series of database calls. The players may consider a lighter web interface less than the full experience, but web interfaces would still cause massive slowdowns if applied to game servers. For at least these reasons, conventional lightweight interfaces are generally limited to interactions with servers that do not enable gameplay, and so cannot slow down game servers.

Many MMOs are now being architected on datacenters, e.g., AWS offered by Amazon® or Azure® offered by Microsoft®. Datacenter based game architectures can handle large amounts of user activities if they can be appropriately managed and if the interface design problem, which is different for every mix of activities a user might want, can be solved. Unless otherwise indicated herein, the materials described in this section are not prior art to the claims in this application and are not admitted to be prior art by inclusion in this section.

SUMMARY

Technology is described for user assembly of lightweight user interfaces for games, e.g., massively multiplayer online games. In various embodiments, the technology can include a set of pre-selectable action modules; an interface element, a messaging element, and a display element for each pre-selectable action module; and a component configured to enable a user to select a subset from the set of pre-selectable action modules. A first subset of the pre-selectable action modules can provide a different user interface than a second subset of the pre-selectable action modules when at least one pre-selectable action module is in the first subset but not the second subset. Action modules may be capable of communicating using a messaging platform with at least one server computing device and relates to a massively multiplayer online gaming system operating at a server computing device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
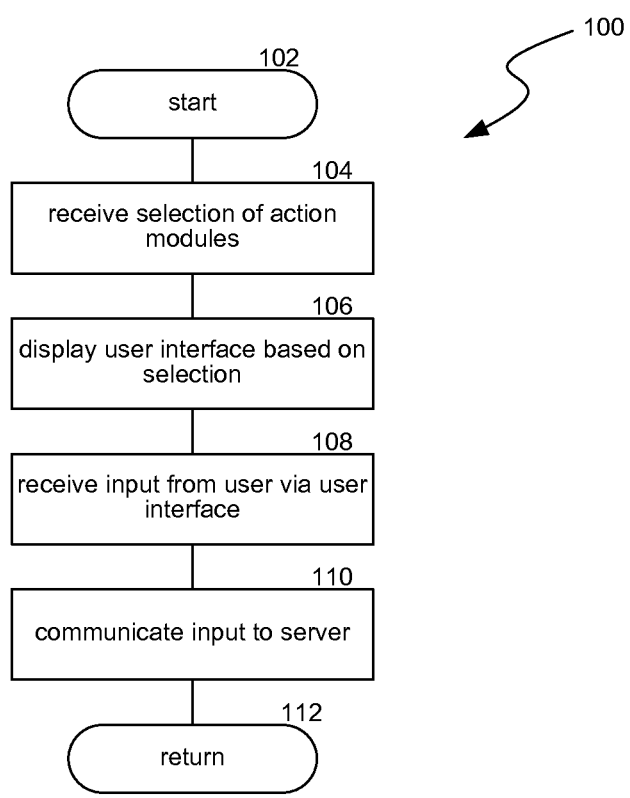
FIGS. 1-2 are flow diagrams illustrating routines the technology may invoke in various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

Technology is described for user assembly of lightweight user interfaces for games, e.g., massively multiplayer online games ("the technology"). In various embodiments, the technology enables a user to select one or more action modules from a palette of action modules. The action modules are capable of receiving input from users, emitting user interface elements, and communicating with server computing devices, e.g., game servers. A user can assemble a relatively lightweight user interface for the portions of the game that the user is interested in interacting with while using a mobile computing device. A user interface can be said to be a lightweight user interface when it does not appear to be cluttered or difficult to use. As one non-limiting example, an application designed for use at a mobile computing device is generally lightweight when compared to a user interface designed for an application that executes at a desktop computing device or game console, e.g., because the application that executes at a desktop computing device or game console comparatively may include more features and options that are readily available. In contrast the application designed for use at a mobile computing device may offer fewer features, or the features may be more hidden. By enabling users to select from a wide range of actions that are subcomponents of the greater game and to compose their selection of such actions, the technology affords higher player engagement with reduced developer effort.

Various datacenter gaming platforms presently exist and new platforms continue to be newly developed or evolved. Many new datacenter gaming platforms are conceptually alike in that they generally use separate "worker" services joined together by queuing and messaging services. Separate services therefore may handle player inventory, crafting, chatting, mapping, etc., including finer divisions of labor such as rendering individual components. Datacenter structures are also generally more scalable, with improvements being made continuously as gaming moves from a big database mainframe model to smaller and smaller separate services that can exist in larger populations.

The disclosed technology can leverage the separable messaging nature of datacenter gaming platforms to offer users a chance to gather user interface elements together at the users' option to build an interface panel that users can then access via a web browser or app so they can take part in whatever part of the game they prefer. The game programmers can offer pre-selected usable actions as self-contained packages ("modules") that provide appropriate messages for each action, address them to the appropriate datacenter queue, and provide logic for displaying the messages returned from the datacenter. When a user performs game "crafting" exercises or otherwise interacts with a game, corresponding messages are sent to game servers to change gameplay status, e.g., so that all game players can see or otherwise experience the gameplay. Datacenter services used by MMOs are generally scalable because many (e.g., hundreds or even thousands) of players may be concurrently playing a game. Thus, adding direct messaging components to a lightweight user interface that communicate with only the pertinent queue or service components (e.g., instead of the entire set of gaming services) does not affect other gameplay, e.g., users fighting monsters or navigating the wilderness. Consequently, the datacenter-based services can be scaled more finely to respond to populations of users at web (or other lightweight) user interfaces—or even full games at desktop computers or game consoles. For example, a user might drag crafting controls to the mobile computing device lightweight user interface so that the user can have their character craft objects while they commute; drag chat windows and guild controls so that they can navigate a long journey or sail a ship carrying friends. The technology thus enables players to maintain a high level of engagement customized to their own desired interests despite the use of a small mobile computing device.

In various embodiments, use of a palette of pre-selectable action modules enables users to compose a list or panel of user selected action modules. Each of the pre-selectable action modules may contain an interface element for a user to interact with, a messaging element to exchange messages with a datacenter-based game, and a display element for showing status or events. The user selected action modules are then stored and configured in a customized user interface, e.g., a web interface, that can be delivered over a network to a computing device, e.g., a mobile computing device or any other computing device. The user selected action modules may be arranged and setup by the user at their desktop computing device or may be selectable and configurable at their mobile computing device.

The pre-selectable action modules may include modules for convenience activities. For example, in the game Second Life®, players often cannot even get dressed before logging into a venue, resulting in semi-naked avatars changing clothes in otherwise "respectable" environments such as professional gatherings. Enabling users to dress their avatar while offline is one example of an action module that would require only a few messages to implement and would not slow down servers based on datacenters because they need not interact with the same servers as the live gameplay users.

Various non-game action modules are also contemplated. One example is an action module that enables the user to access the palette of web actions. Thus, a user could access an application or web interface at which they select action modules that they will then use to interact with the game. Another example is an action module that renders game scenes occasionally, e.g., showing a frame every few seconds while letting a user chat using Voice over Internet Protocol (VOIP). Such a minimal interface provides a great deal of the non-action function of a game with minor computation and hardware needs.

The technology includes modules that can send messages directly to inter-service queues operating at a server computing device through a context manager, which can be useful for datacenter game integration, as well as a user-composition operation that relieves developers of a great deal of interface design work while also enabling users to choose how they will make use of limited mobile screen space.

In various embodiments, the technology may also enable merchandizing, e.g., at an online store, of the pre-selectable action modules so that games can monetize additional engagement by users.

User and player, as referred to herein, can include humans, machines, or any other entity that is capable of interacting with MMO gaming systems. Although various embodiments are described in relation to mobile computing devices, it is to be understood that the technology is suitable also for other types of computing devices, e.g., to make it easier to interact with game servers without needing a full gaming experience.

Turning now to the figures, FIG. 1 is a flow diagram illustrating a routine 100 invoked by the technology in various embodiments. In various embodiments, the technology executes the routine 100 at a client computing device, e.g., a mobile computing device. The technology may invoke the routine 100 when a user indicates to create or revise a lightweight user interface that suits the user's preference or specification. Lightweight user interfaces can be useful when a user desires to use some features of an MMO game at a mobile computing device. The user may generally play the MMO game, e.g., using more of its gameplay features, using a desktop computing device, game console, or other computing device at which lightweight user interfaces are not necessary or useful. The routine 100 begins at block 102 and continues at block 104. At block 104, the routine 100 receives a selection of action modules. As one example, the technology may display a palette of pre-selectable action modules to a user and a user interface for selecting one or more action modules. One or more of the selected action modules may each be capable of communicating using a messaging platform with at least one server computing device and may be related to a massively multiplayer online (MMO) gaming system operating at the server computing device. At block 106, the routine 100 displays a user interface based on the selected action modules, e.g., user interface elements emitted by one or more of the selected action modules. At block 108, the routine 100 receives input from a user via the user interface displayed at block 106. At block 110, the routine 100 communicates to the server computing device an indication of the received user input by employing one or more of the selected action modules to interact with the at least one MMO gaming system operating at the server computing device. The communicated indication of the received user input may cause a game status change at the MMO gaming system that requires changes in how a third user interacts with an online game facilitated by the MMO gaming system. As one example, the game status change can be to make paraphernalia available, equip a player with a new weapon or defense, etc. The routine 100 then returns at block 112.

Those skilled in the art will appreciate that the logic illustrated in FIG. 1 and described above, and in each of the flow diagrams discussed below, may be altered in various ways. For example, the order of the logic may be rearranged, operations may be performed in parallel, illustrated logic may be omitted, other logic may be included, etc.

Figure 2:
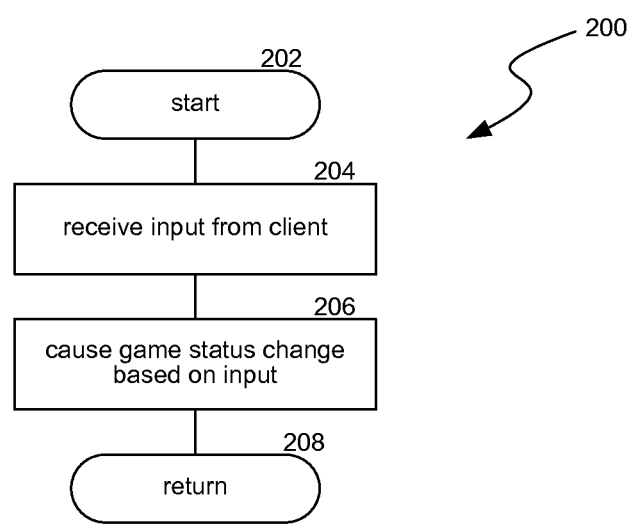

FIG. 2 is a flow diagram illustrating routine 200 the technology may invoke in various embodiments. The technology may invoke the routine 200 at a server computing device to respond to messages that a client computing device (e.g., a mobile computing device) communicates to the server computing device, e.g., in response to user input a lightweight user interface receives from a user at the client computing device. As one example, when an action module executing at a client computing device receives user input, it may employ its messaging component to communicate one or more messages corresponding to the user input to the server computing device to affect gameplay at the server computing device. The routine 200 begins at block 202 and continues at block 204. At block 204, the routine 200 receives input from a client computing device, e.g., when the routine 100 discussed above in relation to FIG. 1 communicates input to the server computing device at block 110. The routine 200 then continues at block 206. At block 206, the routine 200 causes a game status change based on the receipt input. The routine 200 then returns at block 208.

Figure 3:
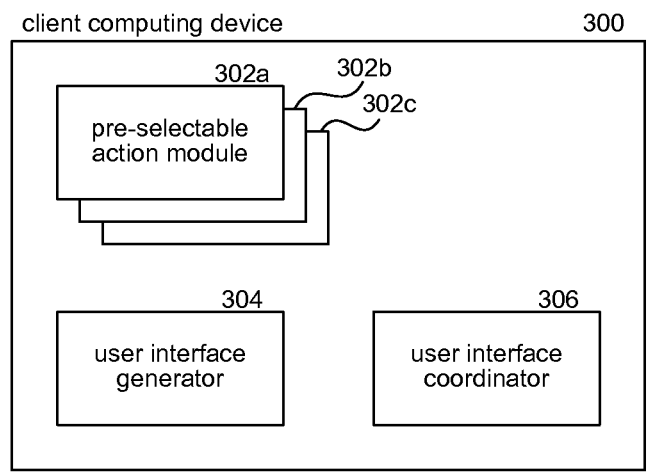
FIGS. 3-6 are block diagrams illustrating components employed by the technology in various embodiments.

FIG. 3 is a block diagram illustrating components 300 employed by the technology in various embodiments. The components 300 may be associated with a client computing device. The components 300 can include one or more pre-selectable action modules 302a, 302b, and 302c; a user interface generator 304; and a user interface coordinator 306. Pre-selectable action modules 302a, 302b, and 302c are described in further detail below in relation to FIG. 4. The user interface generator 304 can generate the user interface at the client computing device, e.g., based on user interface elements emitted by the pre-selectable action modules 302a, 302b, and 302c, and/or other components. The user interface coordinator 306 can coordinate user interface elements emitted by the pre-selectable action modules and other user interface elements.

A user can thus select one or more of the pre-selectable action modules 302a, 302b, and 302c, for use at a lightweight user interface. In various embodiments, the user can select the pre-selectable action modules 302a, 302b, and 302c by selecting checkboxes, dragging and dropping, or using other user interface gestures commonly employed to select a subset of items.

Figure 4:
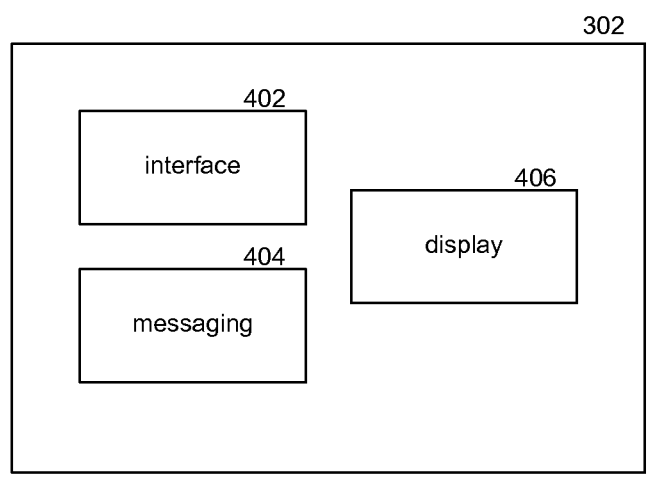

FIG. 4 is a block diagram illustrating components employed by the technology in various embodiments. The illustrated components include components that are associated with a pre-selectable action module 302 illustrated above in relation to FIG. 3. The components include an interface component 402, a messaging component 404, and a display component 406. The interface component 402 is capable of receiving input from users. The messaging component 404 is capable of exchanging messages with other computing devices, e.g., a game server operating at a datacenter. In various embodiments, the messaging component 404 is capable of transmitting messages that a game server can directly insert into a queuing system for state transition management, e.g., after performing some validation to prevent cheating. The messaging component 404 may also include logic to provide context-based input management and prevent attacks over network interfaces. In various embodiments, the messaging component 404 can employ TCP/IP or indeed any networking protocol employed by the gaming system(s) with which the messaging component communicates.

One skilled in the art will recognize that pre-selectable action modules 302 are components that facilitate creation of lightweight user interfaces corresponding to a subset of features offered by MMO gaming systems. MMO gaming service providers can provide their users access to one or more pre-selectable action modules 302 for selection and combination to create a lightweight user interface to suit the users' interests or needs to participate in MMO gaming while employing mobile computing devices.

Figure 5:
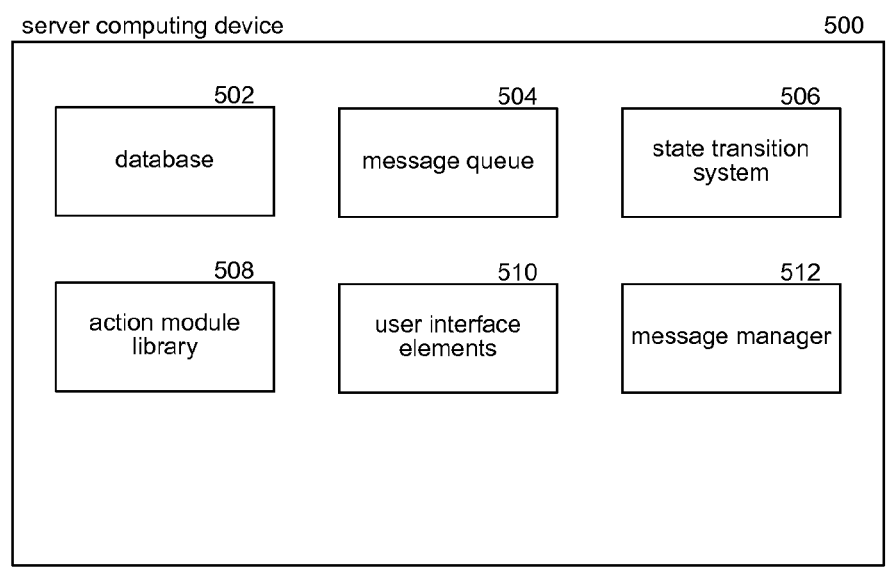

FIG. 5 is a block diagram illustrating components employed by the technology in various embodiments. The illustrated components are associated with a server computing device 500, and include a database 502, a message queue 504, a state transition system 506, an action module library 508, user-interface elements 510, and a message manager 512. The database 502 can store various data, e.g., data associated with a game, its users, etc. The message queue 504 can store incoming and/or outgoing messages. Incoming messages are messages arriving from a different computing device, a different process, etc. Outgoing messages are messages the server generates for delivery to a different computing device a different process etc. In various embodiments, incoming messages may be validated, e.g., to prevent cheating, before they are enqueued. The state transition system 506 manages game state. It is generally known in the art that game systems include state transition systems, e.g., to keep track of player positions, game artifacts or paraphernalia, etc. State tracking may include game-related activities, e.g., automatically disabling player versus player flags, or causing the player to be ineligible for missions or events. The action module library 508 stores a library of pre-selectable action modules, e.g., pre-selectable action modules that are transmitted to client computing devices for selection by users. The user interface elements 510 are user interface elements associated with a game, e.g., representations of players, game artifacts, paraphernalia, etc. The message manager 512 manages messages, e.g., messages stored in the message queue component 504. The message manager 512 may manage messages based on state or context. For example user context may be tracked as on a non-lightweight interface, on a minimal interface, or during various game-related activities, e.g., crafting, navigating, or guild management. These contexts may influence where messages are sent or which types of messages are to be processed. As one example, 3D modeling may not need to be done if the user is using a lightweight user interface. As another example a user using a lightweight interface may be ineligible for certain game activities or events.

The message manager 512 may also prevent barrages of messages to prevent denial of service (DOS) type attacks against a datacenter game once a user interface is enabled for gameplay. The message manager 512 could limit interaction rates to what is reasonable for gameplay, and may include code for detecting automation (so called game "bots") to ensure people do not use the action modules as a link through which to attack the system. The technology may include various features to prevent automation, e.g., random reorganization or code obfuscation. In some embodiments, the technology may not provide an application programming interface so as to prevent automated attacks.

Figure 6:
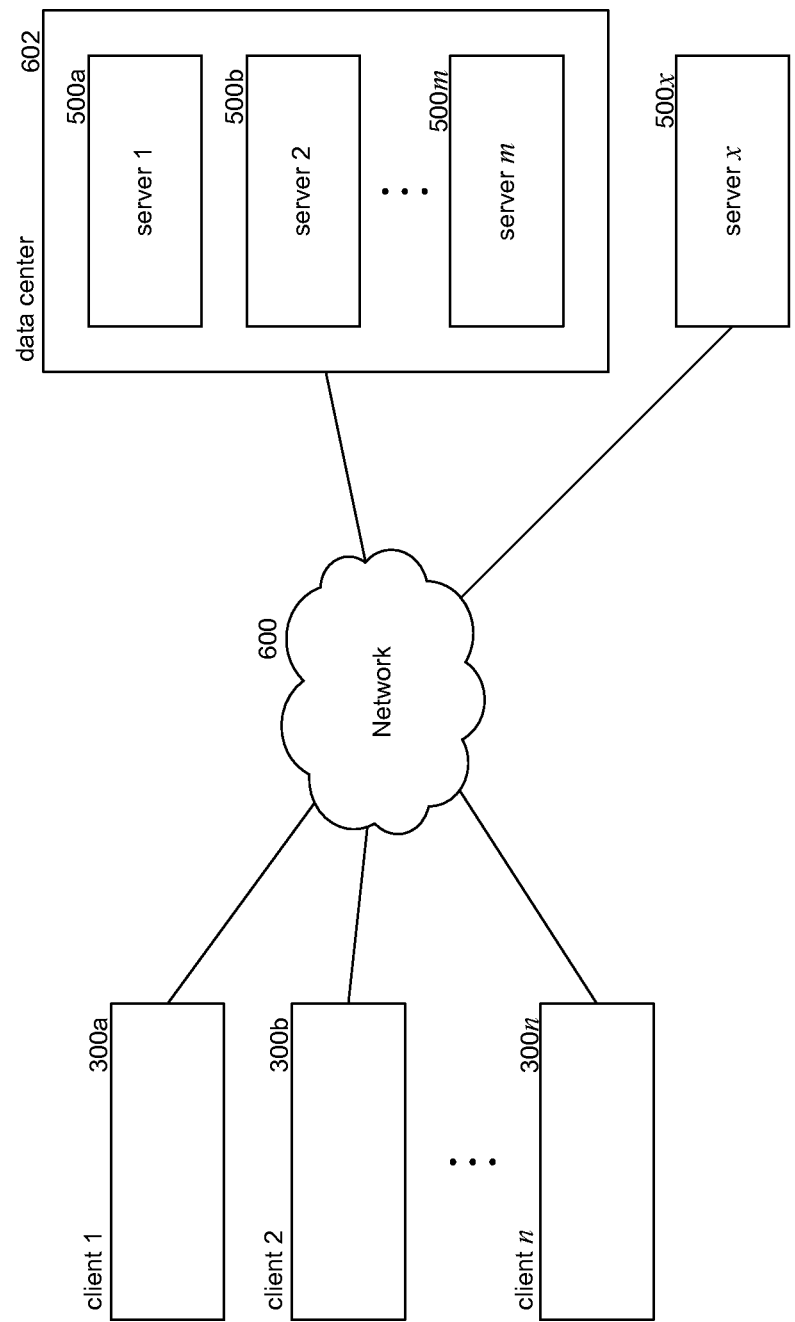

FIG. 6 is a block diagram illustrating components employed by the technology in various embodiments. The components can include one or more client computing devices (e.g., client computing devices 300a, 300b, and 300n), that each are connected via a network 600 to each other and to a datacenter 602 and/or a server 500x. The datacenter 602 can comprise one or more computing devices, e.g., server computing devices 500a, 500b, and 500m. The server computing devices can execute database software, game software, etc.

Figure 7:
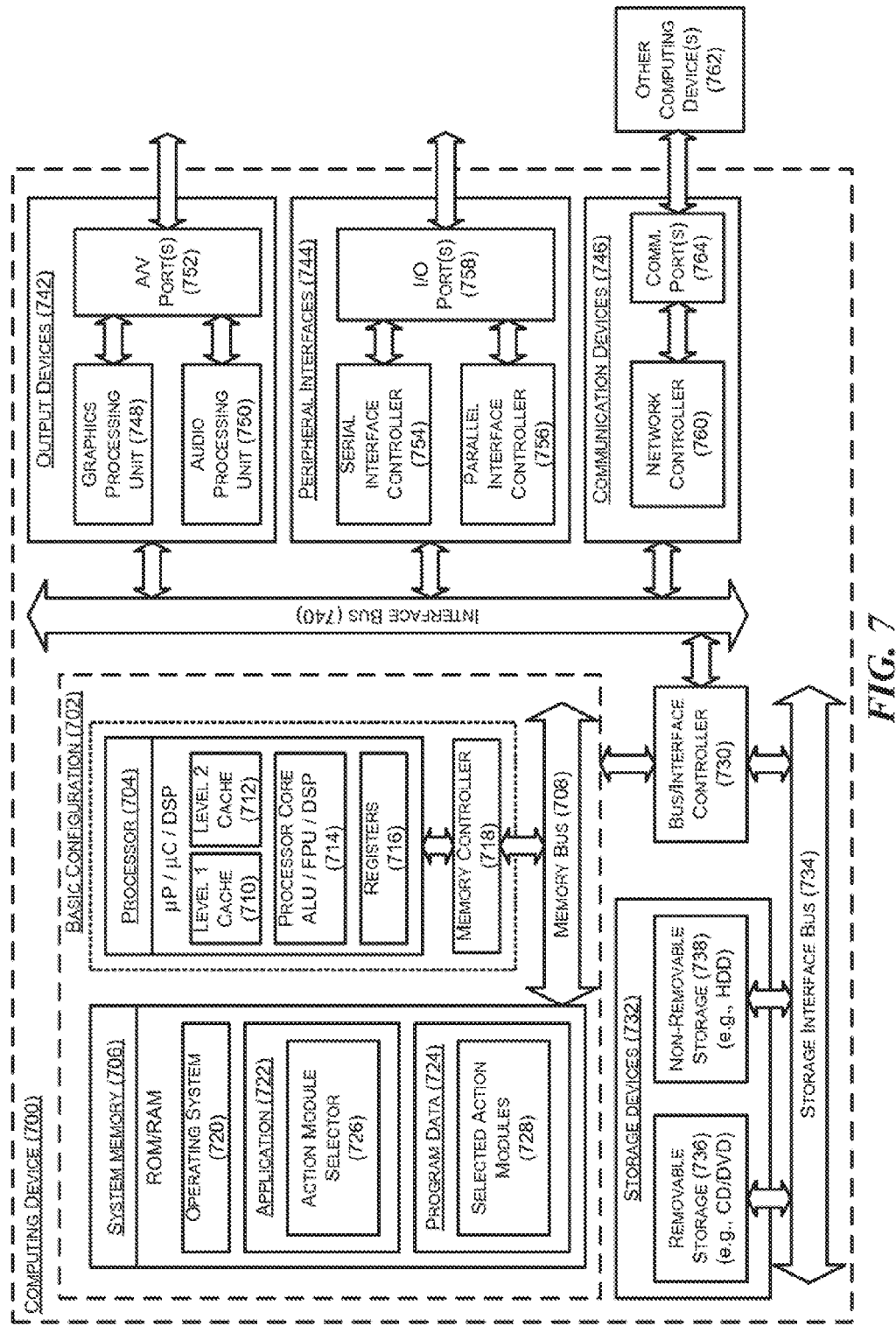
FIG. 7 is a block diagram of an illustrative embodiment of a computing device that is arranged in accordance with at least some embodiments of the present disclosure.

FIG. 7 is a block diagram illustrating one non-limiting example computing device 700 that is arranged in accordance with at least some embodiments of the present disclosure. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor ("μP"), a microcontroller ("μC"), a digital signal processor ("DSP"), or any combination thereof. Processor 704 may include one or more levels of caching, such as a level one cache 710 and a level two cache 712, a processor core 714, and registers 716. One example processor core 714 may include an arithmetic logic unit ("ALU"), a floating point unit ("FPU"), a digital signal processing core ("DSP Core"), or any combination thereof. One example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include an action module selector 726 that is arranged to enable users to select action modules. Program data 724 may include a list of selected action modules 728, as is described herein. In some embodiments, application 722 may be arranged to operate with program data 724 on operating system 720, e.g., to select and employ action modules. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives ("HDD"), optical disk drives such as compact disk ("CD") drives or digital versatile disk ("DVD") drives, solid state drives ("SSD"), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. One example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency ("RF"), microwave, infrared ("IR") and other wireless media. The term computer readable media as used herein may include both storage media and communication media. The term computer readable storage media as used herein does not include communication media.

Computing device 700 may be implemented as a portion of a small-form factor portable (or mobile) electronic device such as a cell phone, a personal data assistant ("FDA"), a personal media player device, a wireless web-watch device, a personal headset device, an application specific device, or a hybrid device that include any of the above functions. Computing device 700 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method, comprising:
   receiving a first selection of one or more selected action modules from a palette of action modules, wherein each of the action modules is configured to receive input via a first lightweight user interface, each of the first selected action modules is configured to communicate using a messaging platform with at least one server computing device, and each of the first selected action modules relates to a corresponding component of a massively multiplayer online gaming system operating at the at least one server computing device;
   displaying, at a first computing device, the first lightweight user interface based on the first selected action modules, the first lightweight user interface comprised of output emitted by at least the first selected action modules;
   receiving input via the displayed first lightweight user interface; and
   communicating, to the at least one server computing device, an indication of the received input by employing one or more of the first selected action modules to interact with the massively multiplayer online gaming system operating at the at least one server computing device, wherein the communicated indication of the received input causes a game status change at the massively multiplayer online gaming system operating at the at least one server computing device, the game status change requiring changes in interactions with an online game facilitated by the massively multiplayer online gaming system.

2. The method of claim 1, further comprising:
   receiving a second selection of one or more selected action modules from the palette of action modules, wherein each of the second selected action modules is configured to communicate using a messaging platform with at least one server computing device and relates to a corresponding component of the massively multiplayer online gaming system operating at the at least one server computing device, at least one of the second selected action modules being different from the first selected action modules; and
   displaying, at a second computing device, a second lightweight user interface based on the second selected action modules, the second lightweight user interface comprised of output emitted by at least the second selected action modules, wherein the second lightweight user interface is different from the first lightweight user interface.

3. The method of claim 1, wherein the receiving the input via the displayed first lightweight user interface includes receiving input to craft a game element, and the game status change includes enabling a user to acquire the game element crafted by another user.

4. The method of claim 1, further comprising installing, at the first computing device, an action module.

5. The method of claim 4, further comprising selecting the installed action module from a marketplace for action modules.

6. The method of claim 1, further comprising:
   determining a context for a user; and
   identifying a component of the massively multiplayer online gaming system operating at the at least one server computing device with which to communicate.

7. The method of claim 6, wherein the context is at least one of crafting, navigating, or guild management.

8. The method of claim 1, further comprising:
   determining a state for a user; and
   circumscribing activities the user is capable of participating in based on the state.

9. A system, comprising:
   a processor and one or more memories;
   a set of pre-selectable action modules, wherein each action module is configured to receive input via an interface element, each action module is configured to communicate using a messaging platform with at least one server computing device, and each action module relates to a corresponding component of a massively multiplayer online gaming system operating at the at least one server computing device;

an interface element, a messaging element, and a display element for each pre-selectable action module in the set of pre-selectable action modules; and a component configured to select a subset from the set of pre-selectable action modules, wherein a first subset of the pre-selectable action modules provides a different lightweight user interface than a second subset of the pre-selectable action modules when at least one pre-selectable action module is in the first subset but not the second subset.

10. The system of claim 9, further comprising a message management component configured to manage communications between the selected subset of the pre-selectable action modules and a server computing device at which the massively multiplayer online gaming system operates.

11. The system of claim 9, wherein the messaging element is configured to communicate with a server computing device at which the massively multiplayer online gaming system operates.

12. The system of claim 9, further comprising a mobile computing device.

13. The system of claim 12, wherein the mobile computing device is configured to receive input and to display a lightweight user interface.

14. The system of claim 9, further comprising:
a first mobile computing device configured to display a lightweight user interface; and
a second mobile computing device configured to display a different lightweight user interface, and
wherein the lightweight user interface and the different lightweight user interface are dependent on the selected subset of pre-selectable action modules.

15. The system of claim 9, wherein a lightweight user interface is configured to provide a subset of a range of features offered by the massively multiplayer online gaming system based on the selected subset of the pre-selectable action modules.

16. A server computing device operating a massively multiplayer online (MMO) gaming system comprising:
a message queue configured to receive one or more messages from a first client computing device, wherein the one or more messages correspond to input received via a first lightweight user interface at the first client computing device;
a state transition system configured to cause a game state change based on the one or more messages corresponding to the received input, the game status change requiring changes in interactions with an online game facilitated by the MMO gaming system; and
action module library configured to store a set of pre-selectable action modules, each of the pre-selectable action modules being transmitted to the first client computing device for selection,
wherein the first client computing device displays the first lightweight user interface based on a first selected action modules, the first lightweight user interface comprised of output emitted by at least the first selected action modules, and
wherein each of the action modules is configured to receive the input via the first lightweight user interface, each of the first selected action modules is configured to communicate using a messaging platform with the server computing device, and each of the first selected action modules relates to a corresponding component of the MMO gaming system.

17. The server computing device of claim 16, wherein each of the pre-selectable action modules is further transmitted to a second client computing device for selection,
wherein each of a second selected action modules is configured to communicate using a messaging platform with the server computing device and relates to a corresponding component of the MMO gaming system, at least one of the second selected action modules being different from the first selected action modules; and
wherein a second lightweight user interface is displayed at the second computing device based on the second selected action modules, the second lightweight user interface comprised of output emitted by at least the second selected action modules, wherein the second lightweight user interface is different from the first lightweight user interface.

18. The server computing device of claim 16, further comprising:
message manager configured to manage messages based on state or context.

19. A method performed under control of a server computing device operating a massively multiplayer online (MMO) gaming system, comprising:
transmitting a set of pre-selectable action modules to a client computing device for selection,
wherein each action module is configured to receive input via an interface element, each action module is configured to communicate using a messaging platform with the server computing device, and each action module relates to a corresponding component of the MMO gaming system, and
wherein the client computing device displays a lightweight user interface based on a selected action modules, the lightweight user interface comprised of output emitted by at least the selected action modules;
receiving one or more messages from the client computing device, wherein the one or more messages correspond to input received via the lightweight user interface at the client computing device; and
changing a game status based on the one or more messages corresponding to the received input, the game status change requiring changes in interactions with an online game facilitated by the MMO gaming system.

20. The method of claim 19, further comprising:
identifying a component of the MMO gaming system operating at the server computing device with which to communicate based on a context; and
circumscribing activities a user is capable of participating in based on a state.

* * * * *